(12) United States Patent
Pallotta

(10) Patent No.: US 9,173,087 B2
(45) Date of Patent: *Oct. 27, 2015

(54) REMOTE CHILD MONITOR

(71) Applicant: George Allen Pallotta, The Woodlands, TX (US)

(72) Inventor: George Allen Pallotta, The Woodlands, TX (US)

( * ) Notice: Subject to any disclaimer, the term of this patent is extended or adjusted under 35 U.S.C. 154(b) by 345 days.

This patent is subject to a terminal disclaimer.

(21) Appl. No.: 13/953,087

(22) Filed: Jul. 29, 2013

(65) Prior Publication Data

US 2013/0307684 A1 Nov. 21, 2013

Related U.S. Application Data

(63) Continuation of application No. 12/800,204, filed on May 11, 2010, now Pat. No. 8,340,730.

(51) Int. Cl.

| | | |
|---|---|---|
| *H04W 8/22* | (2009.01) | |
| *H04M 1/725* | (2006.01) | |
| *G08B 21/02* | (2006.01) | |
| *H04W 24/10* | (2009.01) | |
| *H04W 4/00* | (2009.01) | |
| *H04W 4/02* | (2009.01) | |
| *H04W 4/22* | (2009.01) | |
| *H04W 76/00* | (2009.01) | |

(52) U.S. Cl.
CPC ............. *H04W 8/22* (2013.01); *G08B 21/0202* (2013.01); *H04M 1/72577* (2013.01); *H04W 24/10* (2013.01); *H04M 2250/10* (2013.01); *H04M 2250/12* (2013.01); *H04W 4/001* (2013.01); *H04W 4/02* (2013.01); *H04W 4/027* (2013.01); *H04W 4/22* (2013.01); *H04W 76/007* (2013.01)

(58) Field of Classification Search
CPC ....... H04W 8/22; H04W 24/10; H04W 4/027; H04W 4/22; H04W 76/007; H04W 4/02; H04W 4/001; H04M 1/72577; H04M 2250/12; H04M 2250/10; G08B 21/0202
USPC ................ 455/418–420, 556.1, 556.2, 569.1, 455/569.2, 404.1, 404.2
See application file for complete search history.

(56) References Cited

U.S. PATENT DOCUMENTS

| | | | |
|---|---|---|---|
| 5,512,880 A | 4/1996 | Abrams et al. | |
| 5,774,038 A | 6/1998 | Welch et al. | |
| 6,126,233 A | 10/2000 | Gaetano et al. | |
| 6,714,132 B2 * | 3/2004 | Edwards ................ | B60N 2/002 340/457 |
| 6,812,844 B1 | 11/2004 | Burgess | |
| 6,922,147 B1 | 7/2005 | Viksnins et al. | |
| 7,230,530 B1 * | 6/2007 | Almquist ............... | B60N 2/002 180/271 |
| 7,233,240 B2 | 6/2007 | Phillips | |
| 7,714,737 B1 | 5/2010 | Morningstar | |
| 8,038,213 B2 | 10/2011 | Owens | |
| 8,063,788 B1 | 11/2011 | Morningstar | |

(Continued)

*Primary Examiner* — Sharad Rampuria
(74) *Attorney, Agent, or Firm* — Kevin M. Jones; Alexander R. Deese

(57) ABSTRACT

The remote child monitor is an intelligent child seat presence, operator reminder, and emergency alert monitoring system and method that reduces the probability of a child properly secured in a vehicle baby seat being left unattended in a vehicle. The central monitoring device detects when the child is secured in the baby seat, communicates with the driver, the vehicle, and reminds the driver of the child being secured in the baby seat. Multiple layers of communication and back up operators are employed to further reduce the child being ignored. Communications include personal area network, local area network, and cellular networks GPS. Operators include primary, secondary, and emergency (911).

24 Claims, 5 Drawing Sheets

(56) References Cited

U.S. PATENT DOCUMENTS

| | | |
|---|---|---|
| 8,090,504 B2 | 1/2012 | Long et al. |
| 8,154,395 B2 | 4/2012 | Taylor |
| 8,217,796 B2 | 7/2012 | Trummer |
| 8,303,019 B2 | 11/2012 | Foussianes et al. |
| 8,816,845 B2 * | 8/2014 | Hoover ................. B60N 2/002 340/539.11 |
| 2003/0122662 A1 | 7/2003 | Quinonez |
| 2007/0268119 A1 * | 11/2007 | Cram ...................... B60Q 9/00 340/457 |
| 2008/0073141 A1 * | 3/2008 | Jaunarena-Ferrari .... B60Q 9/00 180/268 |
| 2010/0253504 A1 * | 10/2010 | Lliteras ................. G08B 21/22 340/539.11 |
| 2010/0302022 A1 * | 12/2010 | Saban .................... B60N 2/002 340/459 |
| 2011/0121956 A1 | 5/2011 | Rodriguez |
| 2011/0205060 A1 | 8/2011 | Taylor |
| 2013/0015690 A1 | 1/2013 | Mendis et al. |
| 2014/0184404 A1 * | 7/2014 | Schoenberg ........... B60N 2/002 340/457 |
| 2015/0130604 A1 * | 5/2015 | Gomez Collazo ....... B60Q 1/00 340/457 |

\* cited by examiner

REMOTE CHILD MONITOR

BACKGROUND

1. Technical Field of Invention

This invention relates to an alerting system and more particularly to such an alerting system with the functionality to keep an operator reminded.

2. Background of the Invention

The extremely high number of distractions occurring to an operator during most vehicle trips has left far too many children in baby seats with horrible results. This onslaught of distractions to the operator may range from "bumping into a friend" while making a "quick stop" to an involuntary detention while away from the vehicle with the baby secured in the seat. It really doesn't matter how the situation occurs operators can and are distracted. Operators or drivers need a reminder function that will keep them informed and in communication with a robust intelligent multi-range child seat monitoring system

SUMMARY OF THE INVENTION

An embodiment of the invention discloses a child seat monitoring system that intelligently communicates with multiple remote transceivers. The central monitoring device detects when a child is secured in the baby seat, communicates with the driver, the vehicle, and reminds the driver of the child being secured in the baby seat. Multiple layers of communication and back up operators are employed to further reduce the child being ignored. Communications include personal area network, local area network, and cellular networks with positioning. Operators include primary, secondary, and emergency (911).

The child seat safety monitor installs a smart phone with the baby seat installed in a vehicle. The smart phone receives power from the vehicle. The smart phone operating a remote child monitoring program monitors the baby seat for presence of a baby through sensors or clasp engagement. The remote child monitoring program initiates when the baby is secured in the baby seat. The remote child monitoring program will "pair" with another smart phone running the remote child monitoring program within the network coverage accompanying the operator or child care giver. The operator will select the type of "reminder" for example; an audible alert, a vibrate alert, a spoken message, or any visual, sensory, or audible signal that the operator will be reminded but not distracted or surprised by experiencing. The operator must acknowledge the message from the baby seat smart phone. The baby seat smart phone will send periodic reminders to the operator that the baby is secured in the baby seat. When the operator stops the vehicle and opens the door the baby seat phone will send an alert to the operator that the baby is still in the seat. The operator can acknowledge the baby seat monitor smart phone will remind the operator to keep phone with them if they are separating from the vehicle. The operator can also remove the baby from the baby seat and the remote child monitoring program will suspend until the baby is reinstalled. If the operator chooses to make a "short run" for necessary tasks the baby seat monitor smart phone will continue to remind the operator the baby is still in the seat. If the operator travels beyond the initial network coverage the baby seat smart phone will switch to a wider range local area network and reminders will continue until the operator returns to the baby and vehicle. If the local area network is also exceeded or that coverage is also exceeded a cellular network will be deployed using predetermined contact numbers. The operator must respond to the message from the baby seat smart phone or an emergency call will be placed to the secondary back up operator also using a predetermined contact numbers. The secondary operator can respond and rescue the baby by finding the operator or physically saving the baby. If this does not occur the baby seat smart phone will place an emergency call to such as 911 notifying the authorities that a child is at risk for unintentional abandonment.

The remote child monitor system is intelligent as it will seek out operators and pair with the operator's smart phone and follow with reminders to assist operators to not neglect or forget the baby in the baby seat. The remote child monitor features multiple networks with acknowledge/non-acknowledge (ack/nack) to include a personal area network (PAN), a wide area network (WAN), a Cellular network, and a GPS for time and location. The remote child monitor employs multiple operators with ack/nack (Primary, Secondary, Emergency). The remote child monitor features direct communications to operators (Primary, Secondary, Emergency).

The remote child monitor employs a direct seat interface. The remote child monitor has a vehicle interface directly for enabled vehicle and by OBD-2 interface add on for older vehicles (Bluetooth with VID). The remote child monitor has a direct operator interface for constant communication to keep operator from forgetting the baby in the baby seat. The remote child monitor has operator selectable alerts (Take me with you!) (Don't forget Baby) and Custom "Baby loves you, don't forget".

DETAILED DESCRIPTION OF THE DRAWINGS

Figure 1:
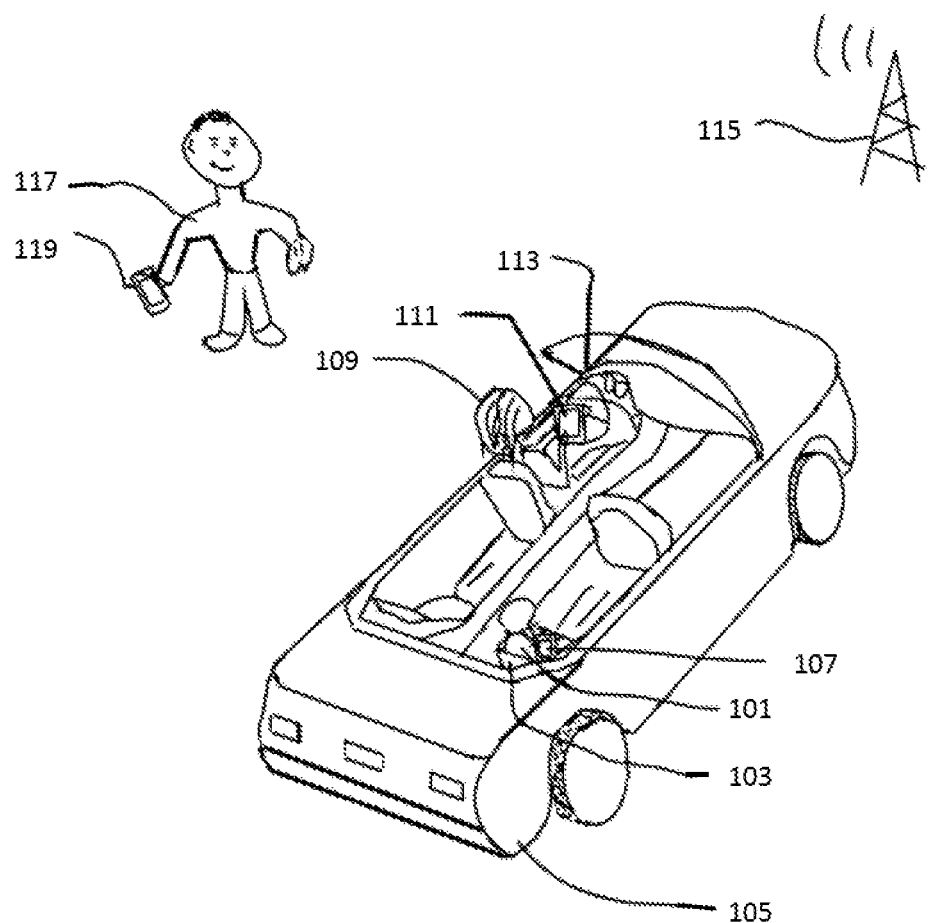
FIG. 1 discloses an overall view of a typical remote child monitor system.

FIG. 1 discloses an overall view of a typical remote child monitor system. A baby 101 is riding in a baby seat 103 in a vehicle 105 with a problem monitoring phone 107. An operator 109 has a cellular parent alert phone 111. The vehicle has a vehicle interface 113. A cellular phone tower(s) 115 provide wide coverage range for distant communications. A back up operator/monitor 117 is shown with a secondary alert phone 119.

Figure 5:
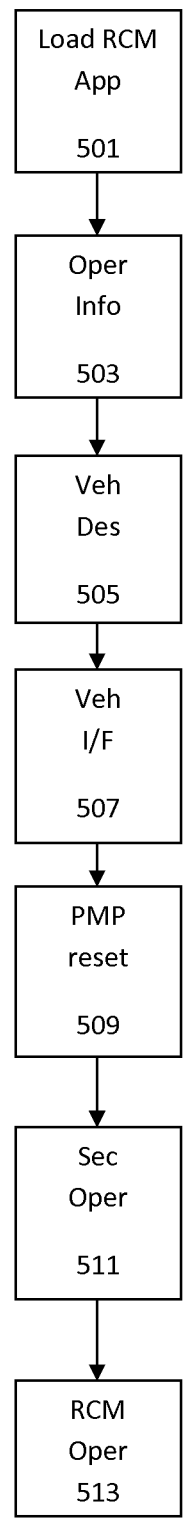
FIG. 5 discloses a set up sequence of a typical remote child monitor system.

Should the operator 109 stop and choose to leave the vehicle 109 with the baby 101 secured in the baby seat 103 the phone 107 will sense the vehicle stopping and the door opening. The phone 107 will remind the operator 109 to take the phone 111 with them while away from the vehicle 105. The phone 107 will maintain communication through reminders to the phone 111 through a personal area network (PAN) during the entire excursion the operator 109 is away from the vehicle 105. The operator 109 must acknowledge the reminders from phone 107 or an alarm/alert will be sent. Initially if the PAN fails (nack) to provide an acknowledge a wide area network WAN will be employed, if the WAN fails (nack) to provide an acknowledge a cellular message will be sent to the secondary operator/monitor 117. If the secondary operator/monitor 117 does not acknowledge (nack) a request for help will be sent to emergency personal. Emergency personal will be provided with vital information as depicted in FIG. 5 of this disclosure to speed recovery and minimize trauma to the baby suffering from the unintended abandonment.

Figure 2:
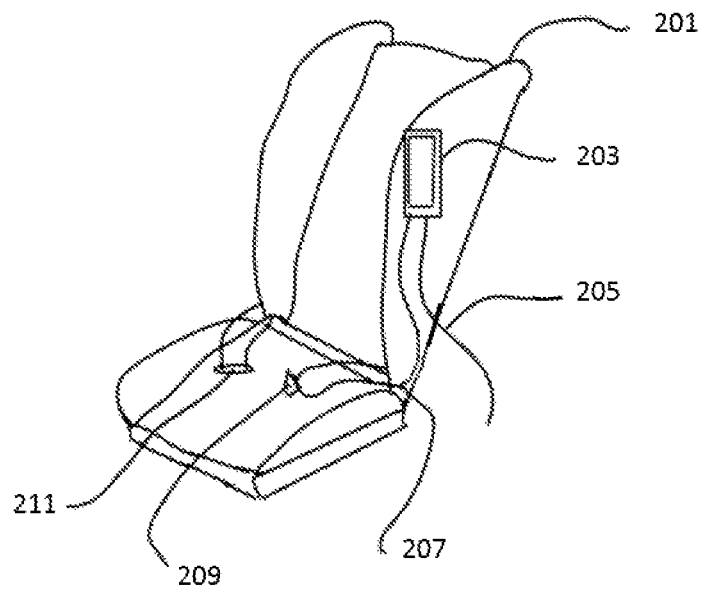
FIG. 2 discloses a view of a typical vehicle baby seat with a remote child monitor system.

FIG. 2 discloses a view of a typical vehicle baby seat with a remote child monitor system. A baby seat 201 is shown with a problem monitoring phone 203. The problem monitoring phone 203 has a vehicle power interface cable 205 that is typically connected to vehicle power to recharge the phone 203. The phone 205 also has a clasp interface 207 to connect to the baby seat 201 belt clasp to determine if the baby is secured in the seat 201. The seat 201 has a male belt clasp 209 and a female belt clasp 211. When the clasp 209 and clasp 211 are joined or mated the phone 203 will sense the closure as the baby being secured in the seat 201. The interface 207 can also connect to a pressure sensor or similar interface to determine when a baby is secured in the baby seat.

Figure 3:
FIG. 3 discloses a block diagram of a vehicle baby seat transceiver portion of a remote child monitor system.

FIG. 3 discloses a block diagram of a vehicle baby seat transceiver portion of a remote child monitor system. A typical remote child monitor system baby seat transceiver portion is referred to as a problem monitoring phone 333. The problem monitoring phone 333 is comprised of a personal area network (PAN) transceiver 301 for communicating with such as the parent alert phone 111 shown in FIG. 1. Returning to FIG. 2, the problem monitoring phone 333 also has a cellular (Cell) transceiver 303 for communicating over extended areas with secondary backup services, emergency services, and such as the parent alert phone 111 shown in FIG. 1. Returning to FIG. 2, the problem monitoring phone 333 also features an input/output (I/O) 305 for setup, status review, and reset functions. The problem monitoring phone 333 also incorporates a wide area network (WAN) 307 for communicating with phone 111 at distances beyond PAN but still nearby. The WAN 307 is additionally useful for increased location accuracy and backup or emergency communications. The problem monitoring phone 333 also incorporates a global positioning system (GPS) 309 for locating positioning information of the problem monitoring phone 333. The problem monitoring phone 333 also incorporates a microphone (MIC) 311 for verbal input and commands. The problem monitoring phone 333 also incorporates a display (DISP) for informing operators, backup, or emergency of status and appropriate actions. The problem monitoring phone 333 also incorporates a speaker (SPKR) 315 for audible instructions, music, or appropriate sounds. The problem monitoring phone 333 also incorporates a processor (PROC) 317 for supervising the problem monitoring phone functions and program operation. The problem monitoring phone 333 also incorporates a memory (MEM) 319 for storing, retaining, and saving operational information. The problem monitoring phone 333 also incorporates a battery (BATT) 321 for supplying power to phone 333. The problem monitoring phone 333 also incorporates a charger (CHGR) 323 to recharge BATT 321 and supply power to phone 333.

Figure 4:
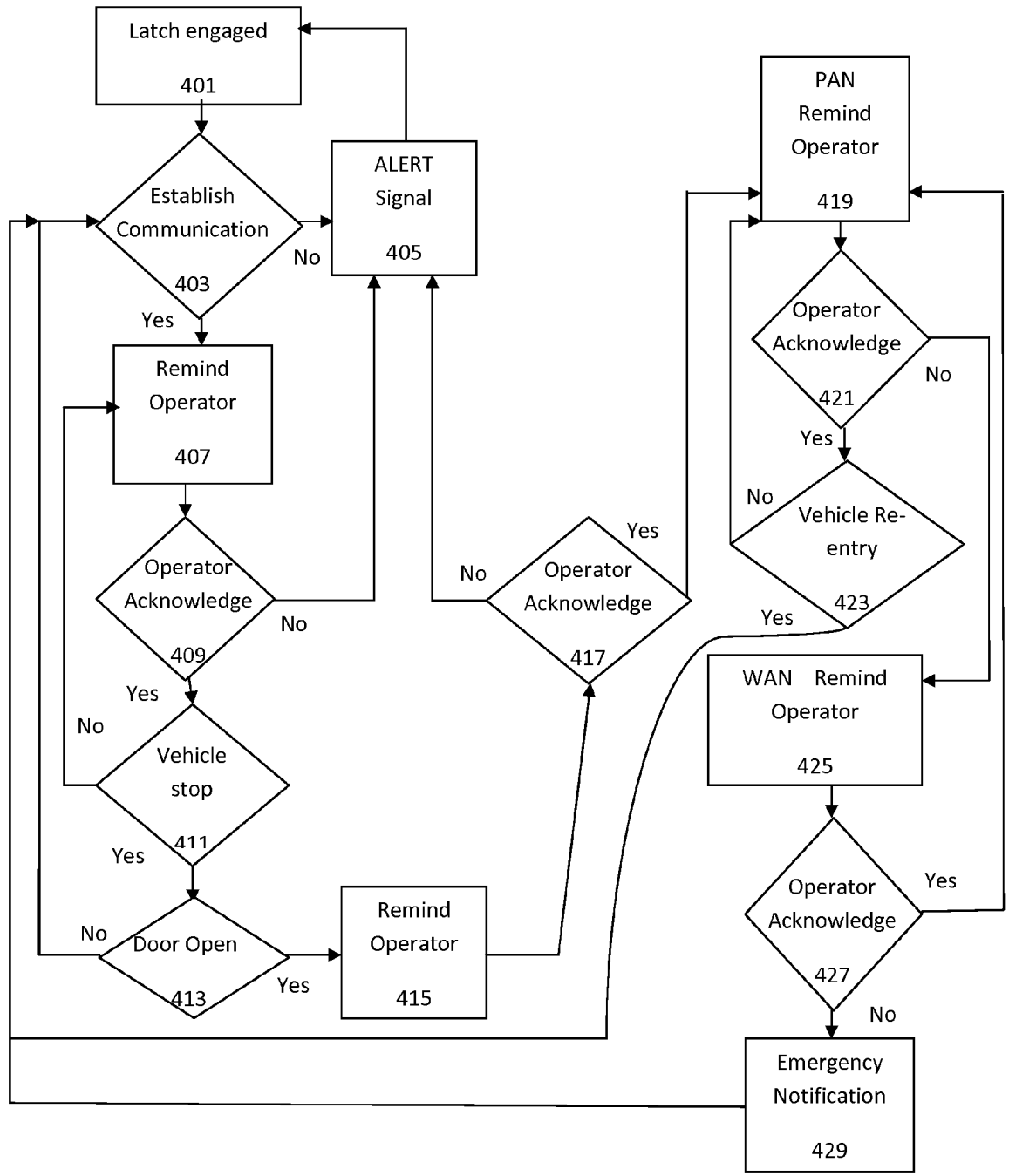
FIG. 4 discloses a system flow for a typical remote child monitor system.

FIG. 4 discloses a system flow for a typical remote child monitor system. The system flow disclosed will typically operate within a problem monitoring phone 333 detailed in FIG. 3. Returning to FIG. 4, the problem monitoring phone 333 will begin operating when latch engaged box 401 condition is satisfied. Engagement of the latch is typically a mechanical operation and the closing of the physical circuit can be the trigger to indicate engagement and start operations, however, any appropriate signal to indicate a baby secured into a child seat will satisfy initiation. When box 401 has been satisfied the flow attempts to establish communication box 403 typically the communication is over a personal area network from phone 107 to phone 111 as shown in FIG. 1.

Returning to FIG. 4 if no communication (nack) can be established in box 403 an alert signal box 405 is emitted to inform the operator that a problem exists and attention is needed. The signal from box 405 will be audible and visual to cue the operator of the specific problem and recommended fixes. If communication is established in box 403 the system flow will remind operator box 407 that a baby is secured in the baby seat. The operator will acknowledge box 409 (ack) the reminder and the system flow will continue. If the operator does not acknowledge box 409 (nack) the reminder the flow will go to box 405 and an alert to respond to the reminder will be presented to the operator typically on phone 111. Following the operator acknowledgement (ack) the program examines if for vehicle stop box 411. Determining if the vehicle has stopped can be from the vehicle interface, a Bluetooth enabled vehicle, a WiFi enabled vehicle, or a Comm Blocker Application operating on phone 107. If the vehicle has not stopped the system flow will return to remind operator box 407 and loop until an acknowledgement box 409 (ack) is missed or the vehicle stops box 411. If the vehicle has stopped the system flow looks for a door opening either from a vehicle interface, a Bluetooth enabled vehicle, a WiFi enabled vehicle, or a direct connection to the driver's door opening switch. If the door open box 413 is not met the system will loop until an acknowledgement box 409 is missed, the vehicle stops box 411, and door open box 413 changes to yes. If the door open box 413 is yes the remind operator box 415 will remind the operator to take the phone 111 with them if they are leaving the vehicle. The operator acknowledge box 417 will trigger an alert signal box 405 if not responded to (nack). The operator acknowledge box 417 when acknowledged (ack) by operator will continue PAN remind operator box 419. This period of the operator being outside the vehicle will be considered critical and during normal operation the operator acknowledge box 421 will receive acknowledgement (ack) and system flow will continue to vehicle re-entry box 423. Vehicle re-entry can be established through a vehicle interface, a Bluetooth enabled vehicle, a WiFi enabled vehicle, or a direct connection to the driver's door opening switch. Once an operator has returned from an excursion outside the vehicle standard establish communication box 403 flow will operate. Should operator acknowledge box 421 (ack) acknowledgement not be received a WAN remind operator box 425 will be attempted. The WAN function is typically wider range than a PAN signal and minor signal errors can be avoided with such an intermediate communication schema. If the operator acknowledge box 427 is acknowledged (ack) the system will re-enter PAN remind operator box 419 and continue outside vehicle operation until operator re-enters vehicle. If the operator acknowledge box 427 is not acknowledged (nack) an emergency notification box 429 is sent. The first action of box 429 is to seek out a secondary alert phone 119 operator as shown in FIG. 1. Returning to FIG. 4, the box 429 when phone 119 acknowledges (ack) will send critical information to the phone 119 as to the baby/operator situation. The phone 119 operator can respond directly or choose to notify emergency personal of the situation. Should the phone 119 operator not acknowledge (nack) emergency personal will be notified of baby/operator situation and critical information including: How long has baby been unattended, baby name, operator name, secondary operator name, vehicle description, vehicle location, phone 107 reset codes, operator phone number (107 and 109).

FIG. 5 discloses a set up sequence of a typical remote child monitor system. To employ the functionality of the remote child monitor system an operator will first load remote child monitor application box 501 into an appropriate smart phone or equivalent. Following loading of box 501 operator information box 503 will be inserted, to include; operator name, address, phone number, reminder select, and relationship to baby (i.e. parent, care giver, etc.). The operator selectable alerts will now be selected (Take me with you!) (Don't forget Baby) and Custom "Baby loves you, don't forget".

Next a vehicle description box 505 will be entered, to include; vehicle make, model, year, color, and license number (note: smart vehicle can auto load this information). Next a vehicle interface box 507 is available for non-smart vehicles requiring a vehicle interface device that should be available to emergency personal to open a locked vehicle, an emergency code for smart vehicles and vehicles with an add-on vehicle interface will be entered here. Next a problem monitoring phone reset box 509 is presented for operators to enter the PMP reset code to cease an alarm previously activated. Next a secondary operator box 511 is presented for the operator to enter a secondary operator vital information to include; secondary operator name, address, phone number and relationship to baby (i.e. parent, care giver, etc.). Next the remote child monitor box 513 application is ready to be employed to avoid unintentional neglect. The system flow described in FIG. 4 will begin with the baby being placed in the baby seat and the clasp being engaged.

A suitable complimentary application is disclosed in more detail in U.S. Pat. No. 8,340,730 issued on Dec. 25, 2012 to inventor George A. Pallotta. The subject matter of which is hereby incorporated by reference in it's entirety into this disclosure.

Operation

An operator seeking to operate the remote child monitor will employ a PMP smart cell phone with PAN (such as Bluetooth), WAN (such as WiFi), and cellular communication capabilities for association with the desired baby seat. The recharging cable from the host vehicle will allow the phone to be kept in the vehicle with the baby seat. The recharging cable will be connected. The clasp interface from the phone will be connected to the phone either by direct wire or radio frequency interface. The RCM PMP App will be loaded into the PMP. The PMP App will be typically configured with a minimal set of data contain the following:

Operator's Name and phone number,
Child's Name, age,
Vehicle Description,
Vehicle location,
Vehicle Interface Information (including emergency door open),
Select Reminder,
PMP reset number,
Emergency number (typically 911),
Emergency message, and
Secondary operator's Name and phone number.

An operator's smart phone referred to as the PAP will next be configured. The PAP requires the RCM PAP App be loaded and configured to monitor the baby status and avoid unintended neglect of the baby.

A Vehicle Interface can be made directly with vehicles having PAN capabilities. Less capable vehicles will need an auxiliary vehicle interface capable of communicating with the vehicle on board functions and diagnostics and a PAN or WAN.

A back up for the operator can be configured with a smart phone, this phone will be referred to as the SAP. The SAP requires the RCM SAP App be loaded and configured to back up the PAP should an emergency occur. The SAP is only notified if the baby is left unattended and the PAP is not responding.

What is claimed is:

1. An intelligent child seat monitoring system that reduces the probability of a child properly secured in a vehicle baby seat, being left unattended implementing critical reminders comprised of:
   a smart phone(s),
   a communication network,
   a Cellular network,
   a child secured in a vehicle baby seat,
   a series of communication protocols operating in a smart phone from the baby seat to communicate, through reminders to an operator, performing as child care giver, monitoring another smart phone in proximity of the operator of potential danger from unintentional neglect to the child secured in the baby seat,
   a plurality of communication networks over which to communicate potential danger from neglect from the baby seat smart phone to the operator smart phone,
   a preprogrammed network notification selection protocol(s) to further minimize unintentional danger from neglect to the baby in the baby seat,
   a plurality of operators predetermined to receive notifications providing a fail-safe operator notification of potential danger from neglect to the baby in the seat,
   a plurality of programmed notifications providing fail-safe operation with acknowledge reply required,
   a emergency information alert message,
   a baby seat presence sensor interface for the baby is secured in the baby seat, and
   a plurality of reminders including operator notification alerts to reduce occurrence of unintentional abandonment by neglect.

2. The intelligent child seat monitoring system of claim 1, wherein the smart phone includes; a cellular transceiver, GPS, display, processor, memory, battery, charger, microphone, speaker, input/output, Bluetooth, Local Area Network.

3. The intelligent child seat monitoring system of claim 1, wherein a personal area network PAN provides communication network for short ranges.

4. The intelligent child seat monitoring system of claim 1, wherein a local area network LAN provides communication network for medium ranges.

5. The intelligent child seat monitoring system of claim 1, wherein the cellular network provides a virtually unlimited communication range.

6. The intelligent child seat monitoring system of claim 1, wherein the communication protocols are continuous with a series details containing the level of danger from neglect to the baby in the baby seat.

7. The intelligent child seat monitoring system of claim 1, wherein the plurality of networks is range dependent configuration facilitating short range communication, switching to medium range communication if short range signal is lost, and switching to cellular if medium range signal is lost.

8. The intelligent child seat monitoring system of claim 1, wherein the notifications relate a collection of reminders and alerts to operator(s) depending on level of danger from neglect to the baby.

9. The intelligent child seat monitoring system of claim 1, wherein the notifications protocols implement a sequential switching from short to medium to cellular as distance requires insuring maximum probability of successful communication of notifications.

10. The intelligent child seat monitoring system of claim 1, wherein an acknowledge protocol notifications keep operator involved and reduce the danger from neglect to the baby.

11. The intelligent child seat monitoring system of claim 1, wherein the emergency alert message information contains a collection of critical data including situation and specifics of the child, vehicle appearance, location, POC with contact numbers and time left unattended.

12. The intelligent child seat monitoring system of claim 1, wherein the system communicates with the vehicle through a vehicle communication systems for critical vehicle information.

13. The intelligent child seat monitoring system of claim 1, wherein the system communicates with the vehicle with an add-on communication device interfacing through the vehicle diagnostic port for critical vehicle information.

14. A method of implementing an intelligent child seat monitoring system implementing critical reminders comprising the steps of:
   deploying a plurality of smart phone(s),
   communicating over a local communication network,
   communicating over a Cellular network,
   implementing a series of communication protocols to communicate potential danger by neglect from the baby seat to an operator,
   implementing a plurality of communication networks over which to communicate potential danger by neglect from the baby seat to the operator,
   establishing a preprogrammed network notification selection protocol(s) to further minimize potential danger by neglect to the baby in the baby seat,
   establishing a plurality of operators predetermined to receive notifications providing a fail-safe operator notification of potential danger by neglect to the baby in the seat,
   programming a plurality of programmed notifications providing fail-safe operation with acknowledge reply required,
   implementing a emergency information alert message,
   facilitating a baby seat presence sensor interface for the baby seat, and implementing a plurality of reminders including operator notification alerts to reduce occurrence of abandonment by neglect.

15. The method of implementing an intelligent child seat monitoring system of claim 14, wherein included in the smart phone is a cellular transceiver, GPS, display, processor, memory, battery, charger, microphone, speaker, input/output, Bluetooth, Local Area Network.

16. The method of implementing an intelligent child seat monitoring system of claim 14, wherein device communication for short ranges is accomplished through a personal area network.

17. The method of implementing an intelligent child seat monitoring system of claim 14, wherein device communication for medium ranges is accomplished through a local area network.

18. The method of implementing an intelligent child seat monitoring system of claim 14, wherein device communication for long ranges is accomplished through the cellular network.

19. The method of implementing an intelligent child seat monitoring system of claim 14, wherein the notifications relate a series both reminders and alerts to operator(s) depending on level of danger to the baby.

20. The method of implementing an intelligent child seat monitoring system of claim 14, wherein the notifications protocols implement a communications sequential switching from short to medium to cellular as distance requires insuring maximum probability of successful communication of notifications.

21. The method of implementing an intelligent child seat monitoring system of claim 14, wherein deploying an acknowledge protocol notifications keep operator involved and reduce the danger to the baby.

22. The method of implementing an intelligent child seat monitoring system of claim 14, wherein the emergency alert message contains a collection of critical data including situation and specifics of the child, vehicle appearance, location, POC with contact numbers and time left unattended is transmitted.

23. The method of implementing an intelligent child seat monitoring system of claim 14, wherein communicating with the vehicle through a vehicle communication system for critical vehicle information is accomplished.

24. The method of implementing an intelligent child seat monitoring system of claim 14, wherein communicating with the vehicle through an add-on communication device interfacing through the vehicle diagnostic port for critical vehicle information is accomplished.

\* \* \* \* \*